(12) United States Patent
Matsumura et al.

(10) Patent No.: US 12,088,457 B2
(45) Date of Patent: Sep. 10, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 670 days.

(21) Appl. No.: 17/277,883

(22) PCT Filed: Sep. 21, 2018

(86) PCT No.: PCT/JP2018/035175
§ 371 (c)(1),
(2) Date: Mar. 19, 2021

(87) PCT Pub. No.: WO2020/059140
PCT Pub. Date: Mar. 26, 2020

(65) Prior Publication Data
US 2021/0351975 A1    Nov. 11, 2021

(51) Int. Cl.
*H04L 41/0677* (2022.01)
*H04L 5/00* (2006.01)
*H04W 72/23* (2023.01)

(52) U.S. Cl.
CPC ........ *H04L 41/0677* (2013.01); *H04L 5/0048* (2013.01); *H04W 72/23* (2023.01)

(58) Field of Classification Search
CPC . H04L 41/0677; H04L 5/0048; H04L 27/261; H04L 5/0023; H04W 72/23; H04W 16/28; H04W 24/08; H04B 7/0695; H04B 7/088
See application file for complete search history.

(56) References Cited

FOREIGN PATENT DOCUMENTS

WO    WO-2018143702 A1 *   8/2018    ........... H04B 7/0617

OTHER PUBLICATIONS

Office Action issued in counterpart Japanese Application No. 2020-547597 mailed on Dec. 27, 2022 (8 pages).
Office Action issued in counterpart Indian Application No. 202117017857 mailed on Nov. 2, 2022 (6 pages).
(Continued)

*Primary Examiner* — Mandish K Randhawa
(74) *Attorney, Agent, or Firm* — Osha Bergman Watanabe & Burton LLP

(57) ABSTRACT

A user terminal according to one aspect of the present disclosure includes a receiving section that receives a reference signal (RS) for beam failure detection (BFD), and a control section that determines, in a case that no set of RS indices corresponding to a resource for the BFD is configured by higher layer signaling, RS indices up to a certain number to be included in the set, based on a TCI (Transmission Configuration Indication) state configured for a CORESET (COntrol REsource SET). The control section includes, for a CORESET for which no TCI state is configured, an RS index of a same value as an RS index corresponding to a QCL (Quasi-Co-Location) assumption for the CORESET, in the set. According to one aspect of the present disclosure, it is possible to appropriately identify a reference signal for BFR.

3 Claims, 5 Drawing Sheets

(56) References Cited

OTHER PUBLICATIONS

Qualcomm Incorporated; "Summary of Maintenance for PRACH procedure"; 3GPP TSG-RAN WG1 94, R1-1809903; Gothenburg, Sweden; Aug. 20-24, 2018 (36 pages).
Vivo, "Remaining issues on mechanism to recover from beam failure", 3GPP TSG RAN WG1 Meeting #92bis, R1-1803818, Sanya, China, Apr. 16-20, 2018 (6 pages).
Extended European Search Report issued in European Application No. 18934475.7 mailed on Mar. 18, 2022 (8 pages).
Office Action issued in Russian Application No. 2021109960/07(021390) mailed on Feb. 22, 2022 (9 pages).
Office Action issued in Japanese Application No. JP 2020-547597 mailed on Jul. 12, 2022 (8 pages).
International Search Report issued in PCT/JP2018/035175 on Oct. 30, 2018 (1 page).
Written Opinion of the International Searching Authority issued in PCT/JP2018/035175 on Oct. 30, 2018 (4 pages).
Qualcomm Incorporated; "Beam management for NR"; 3GPP TSG-RAN WG1 Meeting #94, R1-1809711; Gothenburg, Sweden; Aug. 20-24, 2018 (16 pages).
Vivo; "Remaining issues on beam measurement and reporting"; 3GPP TSG RAN WG1 Meeting #94, R1-1808221; Gothenburg, Sweden; Aug. 20-24, 2018 (8 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 8)"; Mar. 2010 (149 pages).
Vivo; "Remaining issues on PDCCH CORESET"; 3GPP TSG RAN WG1 Meeting #93, R1-1806055; Busan, Korea; May 21-25, 2018 (4 pages).
Office Action issued in Japanese Application No. 2020-547597, mailed on Jun. 20, 2023 (9 pages).
Office Action issued in Chinese Application No. 201880099679.0, mailed on Jun. 29, 2023 (14 pages).

\* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of LTE (Long-Term Evolution) have been drafted for the purpose of further increasing high speed data rates, providing lower latency and so on (see Non-Patent Literature 1). In addition, for the purpose of further high capacity, advancement and the like of the LTE (3GPP (Third Generation Partnership Project) Rel. (Release) 8 and Rel. 9), the specifications of LTE-Advanced (3GPP Rel. 10 to Rel. 14) have been drafted.

Successor systems of LTE (e.g., referred to as "5G (5th generation mobile communication system)," "5G+(plus)," "NR (New Radio)," "3GPP Rel. 15 (or later versions)," and so on) are also under study.

In the existing LTE systems (LTE Rel. 8 to Rel. 14), monitoring of radio link quality (radio link monitoring (RLM)) is performed. When a radio link failure (RLF) is detected in RLM, a user terminal (UE (User Equipment)) is requested to perform RRC (Radio Resource Control) connection re-establishment.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), performance of a procedure of detecting a beam failure and switching to another beam (which may be referred to as a "beam failure recovery (BFR) procedure," "BFR," and so on) is under study. For BFR, a UE detects a beam failure by using a configured reference signal resource.

At the same time, for NR, as a control resource set (CORESET), use of CORESET #0, which is a CORESET for SIB1 (System Information Block 1) is under study. Moreover, use of CORESET #0 not only for initial access but for a unicast PDCCH (Physical Downlink Control Channel) after establishment of an RRC connection is under study.

For mapping of a unicast PDCCH to CORESET #0, a BFR procedure needs to be performed for a PDCCH in CORESET #0. However, it is not possible to apply BFR to CORESET #0 in current specifications. Without any clear definition that allows BFR to be applied to CORESET #0, it is not possible to use a unicast PDCCH in CORESET #0, which may cause a reduction in communication throughput.

In view of this, an object of the present disclosure is to provide a user terminal and a radio communication method that can appropriately identify a reference signal for BFR.

Solution to Problem

A user terminal according to one aspect of the present disclosure includes a receiving section that receives a reference signal (RS) for beam failure detection (BFD), and a control section that determines, in a case that no set of RS indices corresponding to a resource for the BFD is configured by higher layer signaling, RS indices up to a certain number to be included in the set, based on a TCI (Transmission Configuration Indication) state configured for a CORESET (COntrol REsource SET). The control section includes, for a CORESET for which no TCI state is configured, an RS index of a same value as an RS index corresponding to a QCL (Quasi-Co-Location) assumption for the CORESET, in the set.

Advantageous Effects of Invention

According to one aspect of the present disclosure, it is possible to appropriately identify a reference signal for BFR.

DESCRIPTION OF EMBODIMENTS (QCL/TCI)

Figure 1:
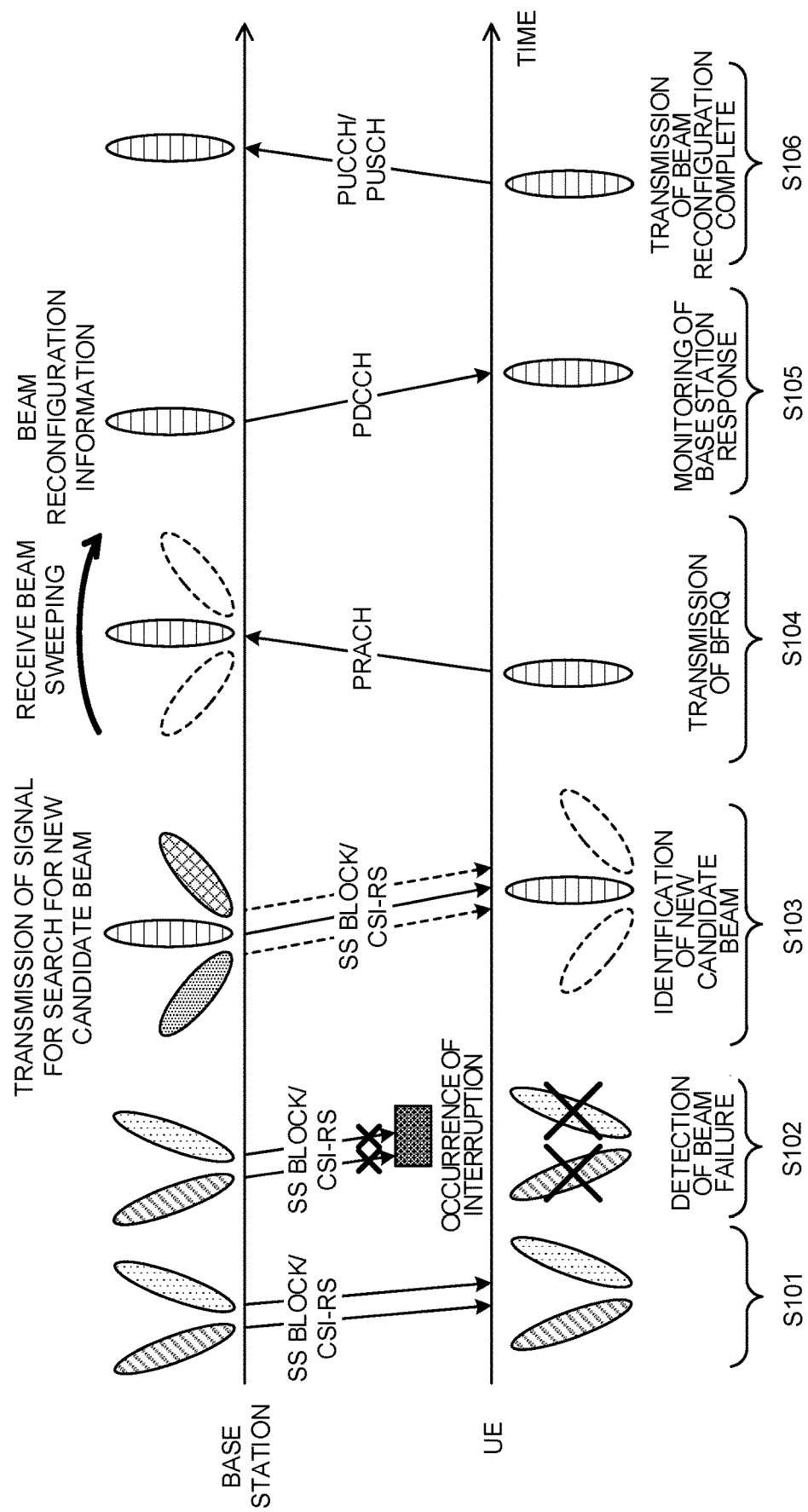
FIG. 1 is a diagram to show an example of a beam recovery procedure in Rel-15 NR.

For NR, control of reception processing (for example, at least one of reception, demapping, demodulation, and decoding) of at least one of a signal and a channel (to be expressed as a "signal/channel") based on a transmission configuration indication state (TCI state) is under study.

Here, the TCI state is information related to quasi-co-location (QCL) of a channel or a signal and may be referred to as a "spatial reception parameter" "spatial relation information (spatial relation info)," and the like. The TCI state may be configured in a UE for each channel or each signal. The UE may determine, based on the TCI state of a channel, at least one of a transmit beam (Tx beam) and a receive beam (Rx beam) of the channel.

QCL is an index that indicates statistical properties of a signal/channel. For example, in a case that a signal/channel and another signal/channel have a QCL relation, this may mean that at least one of Doppler shift, Doppler spread, average delay, delay spread, and a spatial parameter (for example, a spatial reception parameter (Spatial Rx Parameter)) can be assumed to be the same (QCL is held with respect to at least one of these) between the plurality of different signals/channels.

Note that a spatial reception parameter may correspond to a UE receive beam (for example, receive analog beam), and a beam may be identified based on spatial QCL. "QCL (or at least one element of QCL)" in the present disclosure may be interpreted as "sQCL (spatial QCL)."

A plurality of types (QCL types) may be defined for QCL. For example, four QCL types A to D each having a different parameter (parameter set) being assumed to be the same may be provided, and the parameters are described as follows:

QCL type A: Doppler shift, Doppler spread, average delay, and delay spread
QCL type B: Doppler shift and Doppler spread
QCL type C: Doppler shift and average delay
QCL type D: Spatial reception parameter The TCI state may be, for example, information related to QCL between a target channel (or a reference signal (RS) for the channel) and another signal (for example, another downlink reference signal (DL-RS)). The TCI state may be configured (indicated) by higher layer signaling, physical layer signaling, or a combination of these.

In the present disclosure, for example, the higher layer signaling may be any one or combinations of RRC (Radio Resource Control) signaling, MAC (Medium Access Control) signaling, broadcast information, and the like.

For example, the MAC signaling may use MAC control elements (MAC CEs), MAC PDUs (Protocol Data Units), and the like. For example, the broadcast information may be master information blocks (MIBs), system information blocks (SIBs), minimum system information (RMSI (Remaining Minimum System Information)), other system information (OSI), and the like.

For example, the physical layer signaling may be downlink control information (DCI).

For example, a channel for which a TCI state is configured (indicated) may be at least one of a downlink shared channel (PDSCH (Physical Downlink Shared Channel)), a downlink control channel (PDCCH (Physical Downlink Control Channel)), an uplink shared channel (PUSCH (Physical Uplink Shared Channel)), and an uplink control channel (PUCCH (Physical Uplink Control Channel)).

For example, an RS having a QCL relation with the channel may be at least one of a synchronization signal block (SSB) and a channel state information reference signal (CSI-RS), and a measurement reference signal (SRS (Sounding Reference Signal)).

The SSB is a signal block including at least one of a primary synchronization signal (PSS), a secondary synchronization signal (SSS), and a broadcast channel (PBCH (Physical Broadcast Channel)). The SSB may be referred to as an "SS/PBCH block."

A TCI-state information element configured by higher layer signaling (a "TCI-state IE" of RRC) may include one or a plurality of pieces of QCL information ("QCL-Info"). The QCL information may include at least one of information related to a DL-RS having a QCL relation (DL-RS related information) and information indicating a QCL type (QCL-type information). The DL-RS related information may include information such as a DL-RS index (for example, an SSB index or a non-zero-power-CSI-RS resource ID), an index of a cell in which an RS is located, and an index of a BWP (Bandwidth Part) in which the RS is located.

(CORESET #0)

In initial access in NR, detection of an SSB, acquisition of broadcast information transmitted on a PBCH, establishment of a random access connection, and the like are performed.

The UE may detect an SSB and determine a control resource set (CORESET) for system information (for example, SIB1 (System Information Block 1) or RMSI (Remaining Minimum system Information)), based on information (for example, an MIB) transmitted on the PBCH.

A CORESET corresponds to a PDCCH allocation candidate region. A CORESET for SIB1 (or RMSI) may be referred to as a "CORESET for a PDCCH (DCI) to be used for scheduling of a PDSCH for transmitting SIB1."

The CORESET for SIB1 may also be referred to as "CORESET #0 (controlResourceSetZero)," a "CORESET having a CORESET ID (corresponding to an RRC parameter "ControlResourceSetId")=0," a "CORESET configured through a PBCH (MIB) or serving cell common configuration (RRC information element "ServingCellConfigCommon")," a "common CORESET," "common CORESET #0," a "cell specific CORESET," a "CORESET corresponding to Type 0-PDCCH common search space," and the like.

CORESET #0 may be associated with one or more search space sets. The search space set(s) may include at least one of a common search space set and a UE specific search space set. In the present disclosure, a "search space set" and a "search space" may be interchangeably interpreted.

The search space(s) associated with CORESET #0 may include at least one of search space #0 (searchSpaceZero), a search space for SIB1 (Type 0-PDCCH common search space, searchSpaceSIB), a search space for OSI (Type 0A-PDCCH common search space, searchSpaceOtherSystemInformation), a search space for paging (Type 2-PDCCH common search space, pagingSearchSpace), a search space for random access (Type 1-PDCCH common search space, ra-SearchSpace), and the like.

The UE may determine CORESET #0, based on an index (also referred to as "pdcch-ConfigSIB1," "RMSI-PDCCH-Config," and the like) of a certain number of bits (for example, eight bits) in the MIB or a parameter (also referred to as "controlResourceSetZero") for CORESET #0 in SIB1.

For example, the UE may determine at least one of a frequency resource, a time resource, a minimum channel bandwidth, and a subcarrier spacing (SCS) for CORESET #0, based on the index or parameter.

The bandwidth of CORESET #0 may correspond to the bandwidth of a BWP for initial access (also referred to as an "initial BWP").

For the UE, a usable TCI state may be configured by RRC signaling for each CORESET other than CORESET #0, and the UE may activate one or a plurality of TCI states among the configured TCI states, based on a MAC CE. The MAC CE may be referred to as a "TCI state indication for UE-specific PDCCH MAC CE." The UE may monitor a CORESET, based on an active TCI state corresponding to the CORESET.

Meanwhile, the UE may assume that an antenna port for a PDCCH demodulation reference signal (DMRS) in CORESET #0 (or a search space associated with CORESET #0) and the detected SSB have a QCL relation. Note that the UE assuming that a certain CORESET, channel, or reference signal has a specific QCL (for example, QCL type D) relation with another CORESET, channel, or reference signal may be referred to as a "QCL assumption."

A QCL assumption in CORESET #0 may be changed in accordance with a random access procedure. For example, the UE may assume that an SSB or CSI-RS corresponding to a random access channel (PRACH (Physical Random Access Channel)) to transmit has a specific QCL relation (for example, QCL type D) with a DMRS for a PDCCH in CORESET #0. A signal being in QCL with the DMRS for the PDCCH may be referred to as a "QCL source for the PDCCH."

For the UE, a correspondence relationship between a PRACH preamble and a resource for contention free random access (CFRA) and one or more SSBs or CSI-RSs may be configured by higher layer signaling.

The UE may measure the SSB(s) or CSI-RS(s) and transmit a PRACH by using a PRACH resource corresponding to a specific SSB or CSI-RS based on a result of the measurement. The UE may determine the specific SSB or CSI-RS as a QCL source for CORESET #0 after CFRA.

The UE may determine an SSB selected (or determined) during contention based random access (CBRA), as a QCL source for CORESET #0 after CBRA.

(BFR)

For NR, performing communication by using beam forming is under study. To reduce occurrence of a radio link failure (RLF), the following is under study: when quality of a specific beam is deteriorated, a procedure of switching to another beam (which may be referred to as "beam recovery (BR)," "beam failure recovery (BFR)," "L1/L2 (Layer 1/Layer 2) beam recovery," and so on) is performed. Note that the BFR procedure may be simply referred to as BFR.

Note that a beam failure in the present disclosure may be referred to as a "link failure."

FIG. 1 is a diagram to show an example of a beam recovery procedure in Rel-15 NR. The number of beams and so on are merely examples, and are not restrictive.

In an initial state (Step S101) in FIG. 1, the UE performs measurement based on resources for an RS transmitted by using two beams. The RS may be at least one of an SSB and a CSI-RS. The RS measured in Step S101 may be referred to as an "RS for beam failure detection (BFD-RS (Beam Failure Detection RS))" and the like. Beam failure detection may be simply referred to as a "failure detection."

In Step S102, due to interruption of radio waves from the base station, the UE fails to detect the BFD-RS (or received quality of the RS is deteriorated). Such interruption may occur due to the influence of an obstruction, fading, interference, and so on between the UE and the base station, for example.

When certain conditions are satisfied, the UE detects a beam failure. For example, when all the configured BFD-RSs have a BLER (Block Error Rate) less than a threshold, the UE may detect an occurrence of a beam failure. In a case of detection of an occurrence of a beam failure, a lower layer (physical (PHY) layer) of the UE may notify (indicate) a higher layer (MAC layer) of a beam failure instance.

Note that criteria for judgment is not limited to BLER and may be reference signal received power in the physical layer (L1-RSRP (Layer 1 Reference Signal Received Power)). Note that the RSRP in the present disclosure may be interpreted as "RSRQ (Reference Signal Received Quality)," "SINR (Signal to Interference plus Noise Ratio)," and information related to another power or quality.

Instead of the RS measurement or in addition to the RS measurement, the beam failure detection may be performed based on a PDCCH and so on. The BFD-RS may be expected in QCL with a DMRS of a PDCCH monitored by the UE.

Information related to the BFD-RS (for example, RS indices, RS resources, the number of RSs, the number of ports, precoding, and so on), information related to beam failure detection (BFD) (for example, the above threshold), and the like may be configured for (notified to) the UE by using higher layer signaling and so on. The information related to the BFD-RS may be interchangeably interpreted with "information related to BFD resources," "information related to BFD-RS resources," and the like.

In a case to reception of a beam failure instance notification from the PHY layer of the UE, the MAC layer of the UE may start a certain timer (which may be referred to as a "beam failure detection timer"). In a case to reception of a beam failure instance notification a certain number of times or more (for example, "beamFailureInstanceMaxCount" configured through RRC) before expiration of the timer, the MAC layer of the UE may trigger BFR (for example, starts any of random access procedures to be described later).

When there is no notification from the UE, or when the base station receives a certain signal (beam recovery request in Step S104) from the UE, the base station may determine that the UE has detected a beam failure.

In Step S103, for the sake of beam recovery, the UE initiates search for a new candidate beam to be newly used for communication. The UE may measure a certain RS, and may thereby select a new candidate beam corresponding to the RS. The RS measured in Step S103 may be referred to as an "RS for new candidate beam identification (NCBI-RS (New Candidate Beam Identification RS), a "CBI-RS," a "CB-RS (Candidate Beam RS)," and the like. The NCBI-RS may be the same as or different from the BFD-RS. Note that a new candidate beam may be simply referred to as a "candidate beam."

The UE may determine that a beam corresponding to an RS satisfying certain conditions is the new candidate beam. For example, the UE may determine a new candidate beam, based on an RS having L1-RSRP exceeding a threshold among the configured NCBI-RSs. Note that criteria for the determination are not limited to the L1-RSRP. The L1-RSRP related to SSB may be referred to as an "SS-RSRP". The L1-RSRP related to CSI-RS may be referred to as a "CSI-RSRP."

The information related to NCBI-RS (for example, RS resources, the number thereof, the number of ports, precoding, and so on), information related to new candidate beam identification (NCBI) (for example, the above threshold), and so on may be configured for (notified to) the UE by using higher layer signaling and so on. The information related to NCBI-RS may be acquired based on the information related to BFD-RS. The information related to NCBI-RS may be referred to as "information related to NBCI resources."

Note that the "BFD-RS," "NCBI-RS," and the like may be interpreted as a "radio link monitoring reference signal (RLM-RS (Radio Link Monitoring RS))."

In Step S104, the UE that has identified the new candidate beam transmits a beam recovery request (BFRQ (Beam Failure Recovery reQuest)). The beam recovery request may be referred to as a "beam recovery request signal," a "beam failure recovery request signal," and so on.

For example, the BFRQ may be transmitted by using at least one of a PUCCH, a PRACH, a PUSCH, and a configured grant PUSCH. The UE may transmit a preamble (also referred to as an "RA preamble," a "PRACH," and so on) as the BFRQ, by using PRACH resources.

Information related to a correspondence relation between a detected DL-RS (beam) and PRACH resources (RA preamble) may be configured for the UE by using higher layer signaling (RRC signaling and so on), for example.

The BFRQ may include information of the new candidate beam identified in Step S103. Resources for the BFRQ may be associated with the new candidate beam. Information of the beam may be notified by using a beam index (BI), a port index for a certain reference signal, a resource index (for example, a CSI-RS resource indicator (CRI) or an SSB resource indicator (SSBRI)), or the like.

In Step S105, the base station that has detected the BFRQ transmits a response signal (which may be referred to as a "gNB response" and so on) for the BFRQ from the UE. The response signal may include reconfiguration information (for example, configuration information of DL-RS resources) related to one or a plurality of beams. The UE may determine at least one of a transmit beam and a receive beam to be used, based on the beam reconfiguration information.

For example, the response signal may be transmitted in a UE-common search space for a PDCCH. The response signal may be notified by using DCI (PDCCH) with cyclic redundancy check (CRC) scrambled with an identifier (for example, cell-radio RNTI (C-RNTI)) of the UE. When the UE receives a PDCCH corresponding to a C-RNTI related to the UE itself, the UE may determine that contention resolution has succeeded.

The UE may monitor the response signal, based on at least one of the CORESET for BFR and the search space set for BFR.

Regarding the processing of Step S105, a period for the UE to monitor the response from the base station (for example, a gNB) for the BFRQ may be configured. For example, the period may be referred to as a "gNB response window," a "gNB window," a "beam recovery request response window," and so on. When there is no gNB response detected within the window period, the UE may retransmit a BFRQ.

In Step S106, the UE may transmit a message to the base station, indicating that beam reconfiguration has been completed. For example, the message may be transmitted on a PUCCH, or may be transmitted on a PUSCH.

Beam recovery success (BR success) may represent a case where the processing has reached Step S106, for example. On the other hand, beam recovery failure (BR failure) may be equivalent to a case where BFRQ transmission has reached a certain number of times, or a case where a beam failure recovery timer (Beam-failure-recovery-Timer) has expired, for example.

Note that the numbers of the above steps are merely numbers assigned for the sake of description. A plurality of steps may be combined together, or the order may be rearranged. Whether or not BFR is performed may be configured for the UE by using higher layer signaling.

As mentioned above, it is under study that a beam of CORESET #0 (QCL assumption) is changed according to a PRACH transmitted in a random access procedure. It is also under study that a beam of CORESET #0 is explicitly configured by using higher layer signaling (for example, RRC signaling or MAC CEs).

Moreover, use of CORESET #0 not only for initial access but for unicast PDCCH after establishment of an RRC connection is under study. However, for mapping of a unicast PDCCH to CORESET #0, a BFR procedure needs to be performed for a PDCCH in CORESET #0.

For NR, it is under study that a base station configures, for a UE, two BFD resources at maximum per BWP, by using higher layer signaling. For example, the UE may be provided with resources associated with a purpose of a beam failure ("beamFailure") in failure detection resource configuration information (for example, higher layer parameters "failureDetectionResourcesToAddModList," "failureDetectionResources," and the like).

The UE may provide a set of indices corresponding to BFD resources, by the higher layer parameters. For example, the set may be a set of indices (for example, non-zero-power-CSI-RS resource IDs) of a periodic CSI-RS resource configuration. The set may be referred to as a "set go bar (here, "go bar" refers to an expression of "go" with an overline)," an "index set," and the like. This set is simply expressed as a "set go" below.

The UE may perform L1-RSRP measurement and the like by using RS resources corresponding to the indices included in the set $q_0$, to detect a beam failure.

Note that, in the present disclosure, being provided with the above-described higher layer parameters indicating information of the indices corresponding to the BFD resources may be interchangeably interpreted with "being configured with BFD resources," "being configured with BFD-RSs," and the like.

In current NR on the other hand, it is under study that, when no BFD resource is configured for the UE, the UE determines to include, in the set $q_0$, indices of a periodic CSI-RS resource configuration, the indices having the same values as RS indices in the RS set indicated by a TCI state for a CORESET to be used for monitoring a PDCCH.

The UE expects that the set $q_0$ includes up to two RS indices. Note that, it is under study that, when there are two RS indices for one TCI state, the set $q_0$ includes RS indices corresponding to a QCL type D configuration for the corresponding TCI state.

Since the QCL assumption for CORESET #0 changes according to a PRACH transmitted from the UE, failure detection resource configuration information studied for previous NR is not usable for BFR for CORESET #0.

Moreover, for CORESET #0, no TCI state is configured explicitly. For this reason, in NR specifications that have been studied previously, it is not possible to include RS indices corresponding to CORESET #0 in the set $q_0$ when no BFD resource is configured.

For the above reason, it is not possible to apply BFR to CORESET #0 in current specifications. Without any clear definition that allows BFR to be applied to CORESET #0, it is not possible to use a unicast PDCCH in CORESET #0, which may cause a reduction in communication throughput.

In view of the above, the inventors of the present invention came up with the idea of a method of determining a BFD reference signal index to be used for BFD even for a CORESET, such as CORESET #0, for which no TCI state is configured.

Embodiments according to the present disclosure will be described in detail with reference to the drawings as follows. The radio communication method according to each embodiment may be employed independently or may be employed in combination.

Note that, in the following description, the "CORESET for which no TCI state is configured" may be interpreted as "CORESET #0" or may be interpreted as a "CORESET other than CORESET #0."

(Radio Communication Method)

In one embodiment, when no BFD resource is configured for the UE, the UE may determine to include, in the set $q_0$, an index of at least one of (1) and (2) below for a CORESET to be used for monitoring a PDCCH:

(1) for a CORESET for which a TCI state is configured, an index of a periodic CSI-RS resource configuration, the index having the same value as an RS index in the RS set indicated by the TCI state of the CORESET, and (2) for a CORESET for which no TCI state is configured, an SSB index or an index of a periodic CSI-RS resource configuration, the index having the same value as an RS index corresponding to a QCL assumption for the CORESET.

Here, "having the same value as an RS index" may be interpreted as, for example, "having a QCL type D relation with an RS indicated by an RS index."

Regarding (2) above, the UE may determine a QCL assumption for the CORESET for which no TCI state is configured, based on the latest or recent resources of a certain signal/channel (for example, PRACH resources) or beams based on the resources. For example, the UE may assume that a DMRS for the PDCCH in a CORESET for which no TCI state is configured has a certain QCL relation (for example, QCL type D) with an SSB or a CSI-RS corresponding to PRACH transmission using the latest PRACH resources.

Regarding (2) above, the UE may determine a QCL assumption for a CORESET for which no TCI state is configured, based on higher layer signaling (for example, RRC signaling or MAC CE), physical layer signaling (for example, DCI), or a combination of these.

In one embodiment, even when BFD resources are configured for the UE, the UE may perform BFD for CORESETs for which no TCI state is configured, based on the SSB index or the index of the periodic CSI-RS resource configuration in (2) above. In this case, the UE may expect that the set $q_0$ includes up to 2+(the number of CORESETs for which no TCI state is configured) RS indices. In other words, the UE may perform BFD for each of the RSs corresponding to the configured BFD resources and each of the RSs corresponding to the SSB indices or the indices of the periodic CSI-RS resource configuration in (2) above for the CORESETs for which no TCI state is configured.

Note that, suppose a TCI state is configured for CORESET #0, a "CORESET for which a TCI state is configured" in the present disclosure may be interpreted as "CORESET #0." For example, in one embodiment, when BFD resources are configured for or no BFD resource is configured for the UE, the UE may perform BFD for CORESET #0 for which a TCI state is configured, based on the index in (1) above. This may similarly apply to a case of supposing that a beam of CORESET #0 (QCL assumption) is referred to as a "TCI state."

According to one embodiment described above, it is possible to appropriately determine indices to be included in the set $q_0$ even for CORESETs for which no TCI state is configured.

<Variations>

In a case that a QCL assumption for a CORESET (for example, CORESET #0) for which no TCI state is configured is changed from a first assumption to a second assumption, the UE may determine a TCI state (or a QCL assumption) of another or each of a plurality of other configured CORESETs, based on the second assumption.

For example, in a case of updating an assumption that CORESET #0 is in QCL with a specific RS (for example, a CSI-RS), based on the latest PRACH transmission, the UE may determine that the TCI state of another or each of the plurality of other configured CORESETs (for example, CORESETs having CORESET IDs of #1 to #3) is a TCI state having a certain QCL relation (for example QCL type D) with the specific RS among the TCI states configured for the UE.

Note that in each embodiment, the RS indices included in the set $q_0$ may be limited to indices corresponding to active TCI states of the CORESETs or may be determined from indices corresponding to all the TCI states (or the assumed QCL states) configured for the CORESETs.

A description has been given by assuming that the number of indices to be included in the set $q_0$ is two, but this "two" may be interpreted as a certain number greater than two.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 2:
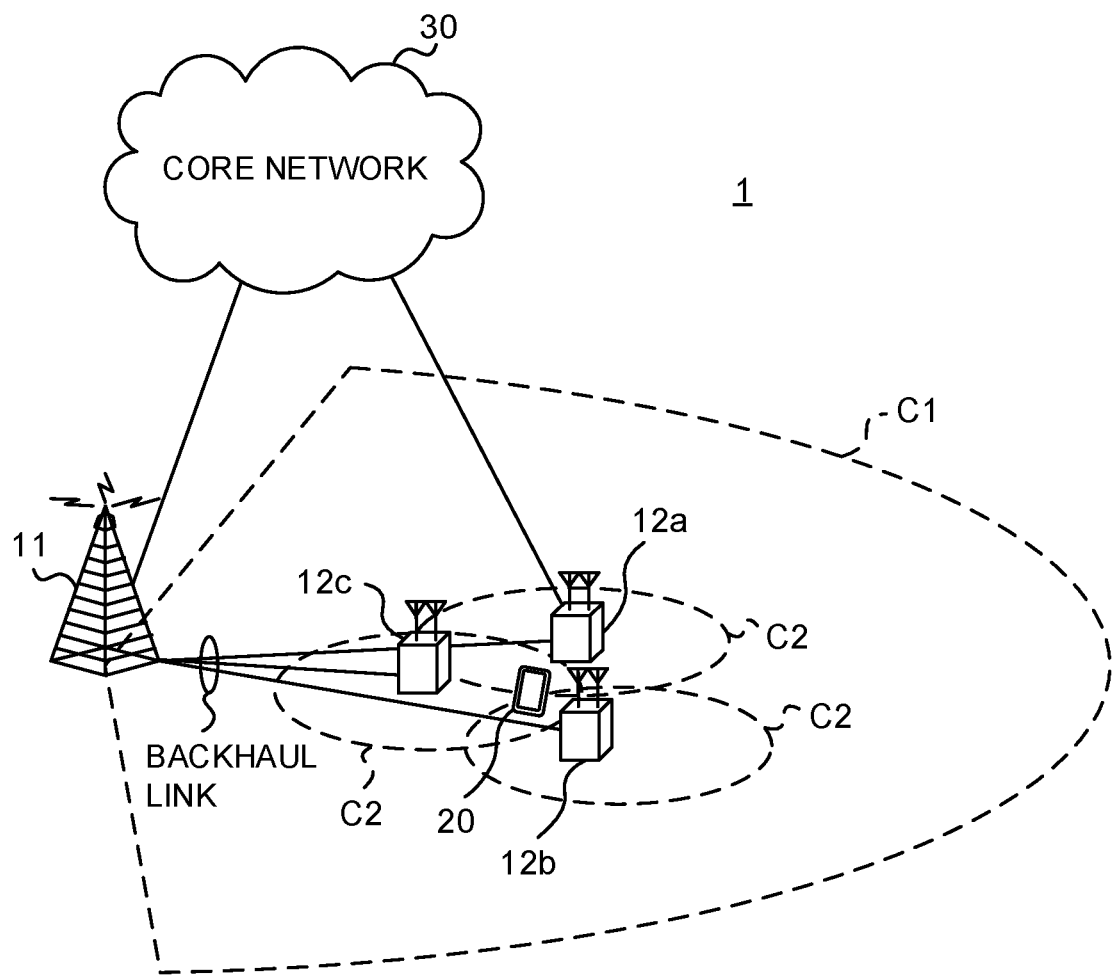
FIG. 2 is a diagram to show an example of a schematic structure of a radio communication system according to one embodiment.

FIG. 2 is a diagram to show an example of a schematic structure of the radio communication system according to one embodiment. The radio communication system 1 may be a system implementing a communication using LTE (Long Term Evolution), 5G NR (5th generation mobile communication system New Radio) and so on the specifications of which have been drafted by 3GPP (Third Generation Partnership Project).

The radio communication system 1 may support dual connectivity (multi-RAT dual connectivity (MR-DC)) between a plurality of RATS (Radio Access Technologies). The MR-DC may include dual connectivity (EN-DC (E-UTRA-NR Dual Connectivity)) between LTE (E-UTRA (Evolved Universal Terrestrial Radio Access)) and NR, dual connectivity (NE-DC (NR-E-UTRA Dual Connectivity)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NN-DC (NR-NR Dual Connectivity)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (FR1 (Frequency Range 1)) and a second frequency band (FR2 (Frequency Range 2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the CPRI (Common Public Radio Interface), the X2 interface and so on) or a wireless connection (for example, an NR communication). For example, if an NR communication is used as a backhaul between the base stations 11 and 12, the base station 11 corresponding to a higher station may be referred to as an "IAB (Integrated Access Backhaul) donor," and the base station 12 corresponding to a relay station (relay) may be referred to as an "IAB node."

The base station 10 may be connected to a core network 30 through another base station 10 or directly. For example, the core network 30 may include at least one of EPC (Evolved Packet Core), 5GCN (5G Core Network), NGC (Next Generation Core), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), CP-OFDM (Cyclic Prefix OFDM), DFT-s-OFDM (Discrete Fourier Transform Spread OFDM), OFDMA (Orthogonal Frequency Division Multiple Access), SC-FDMA (Single Carrier Frequency Division Multiple Access), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (PDSCH (Physical Downlink Shared Channel), which is used by each user terminal 20 on a shared basis, a broadcast channel (PBCH (Physical Broadcast Channel)), a downlink control channel (PDCCH (Physical Downlink Control Channel)) and so on, may be used as downlink channels.

In the radio communication system 1, an uplink shared channel (PUSCH (Physical Uplink Shared Channel), which is used by each user terminal 20 on a shared basis, an uplink control channel (PUCCH (Physical Uplink Control Channel)), a random access channel (PRACH (Physical Random Access Channel)) and so on may be used as uplink channels.

User data, higher layer control information, SIBs (System Information Blocks) and so on are communicated on the PDSCH. User data, higher layer control information and so on may be communicated on the PUSCH. The MIBs (Master Information Blocks) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One SS may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Transmission confirmation information (for example, which may be also referred to as "HARQ-ACK (Hybrid Automatic Repeat reQuest)," "ACK/NACK," and so on) of channel state information (CSI), scheduling request (SR), and so on may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SSB (SS Block)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 3:
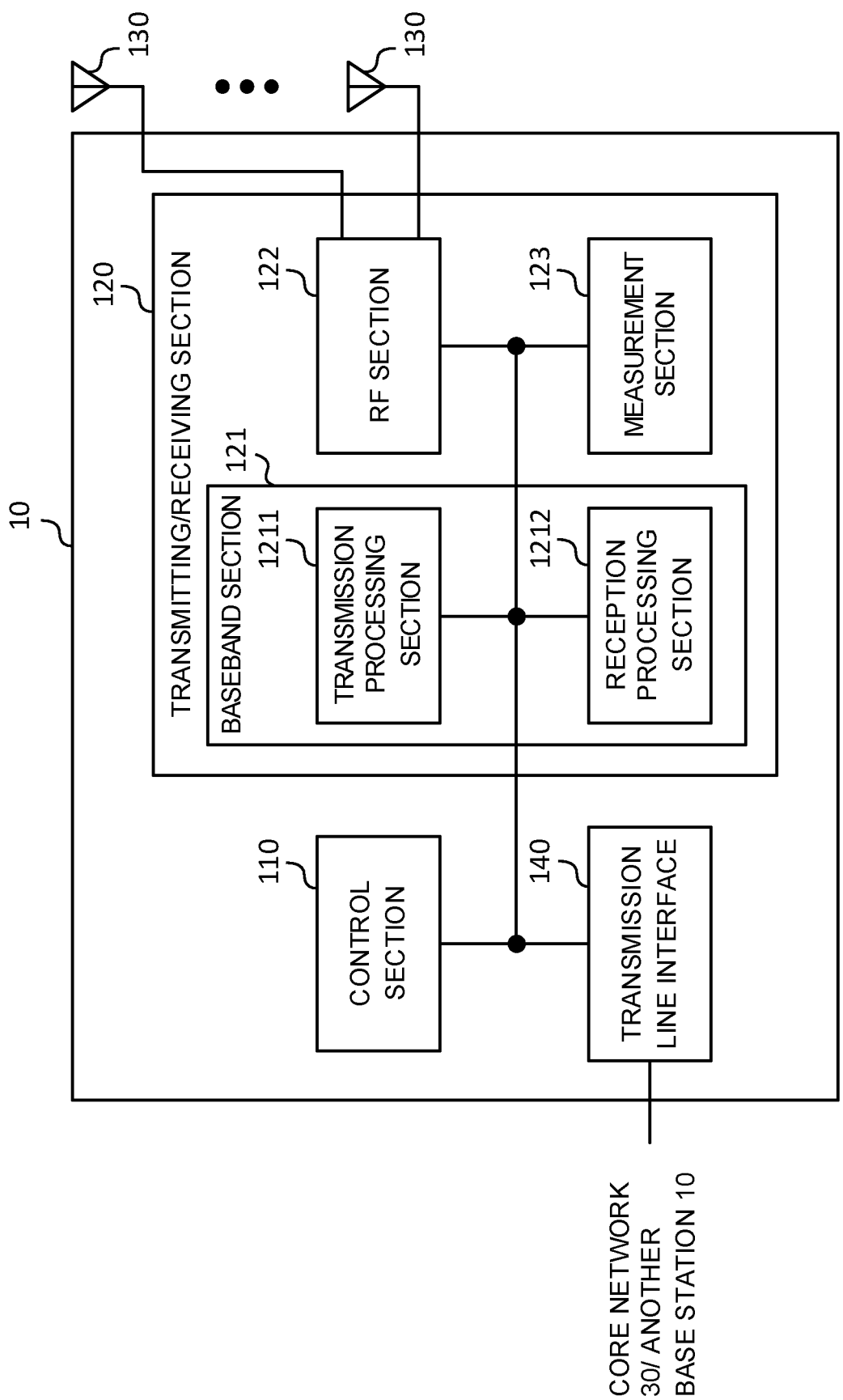
FIG. 3 is a diagram to show an example of a structure of a base station according to one embodiment.

FIG. 3 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, an RF (Radio Frequency) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may performs the processing of the PDCP (Packet Data Convergence Protocol) layer, the processing of the RLC (Radio Link Control) layer (for example, RLC retransmission control), the processing of the MAC (Medium Access Control) layer (for example, HARQ retransmission control), and so on, for example, on data and control information and so on acquired from the control section 110, and may generate bit string to transmit.

The transmitting/receiving section 120 (transmission processing section 1211) may performs transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform RRM (Radio Resource Management) measurement, CSI (Channel State Information) measurement, and so on, based on the received signal. The measurement section 123 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the control section 110 may control RLM, BFR, and the like for the user terminal 20. Each of the transmitting/receiving sections 120 may transmit a reference signal for beam failure detection (BFD-RS (Beam Failure Detection Reference Signal))."

(User Terminal)

Figure 4:
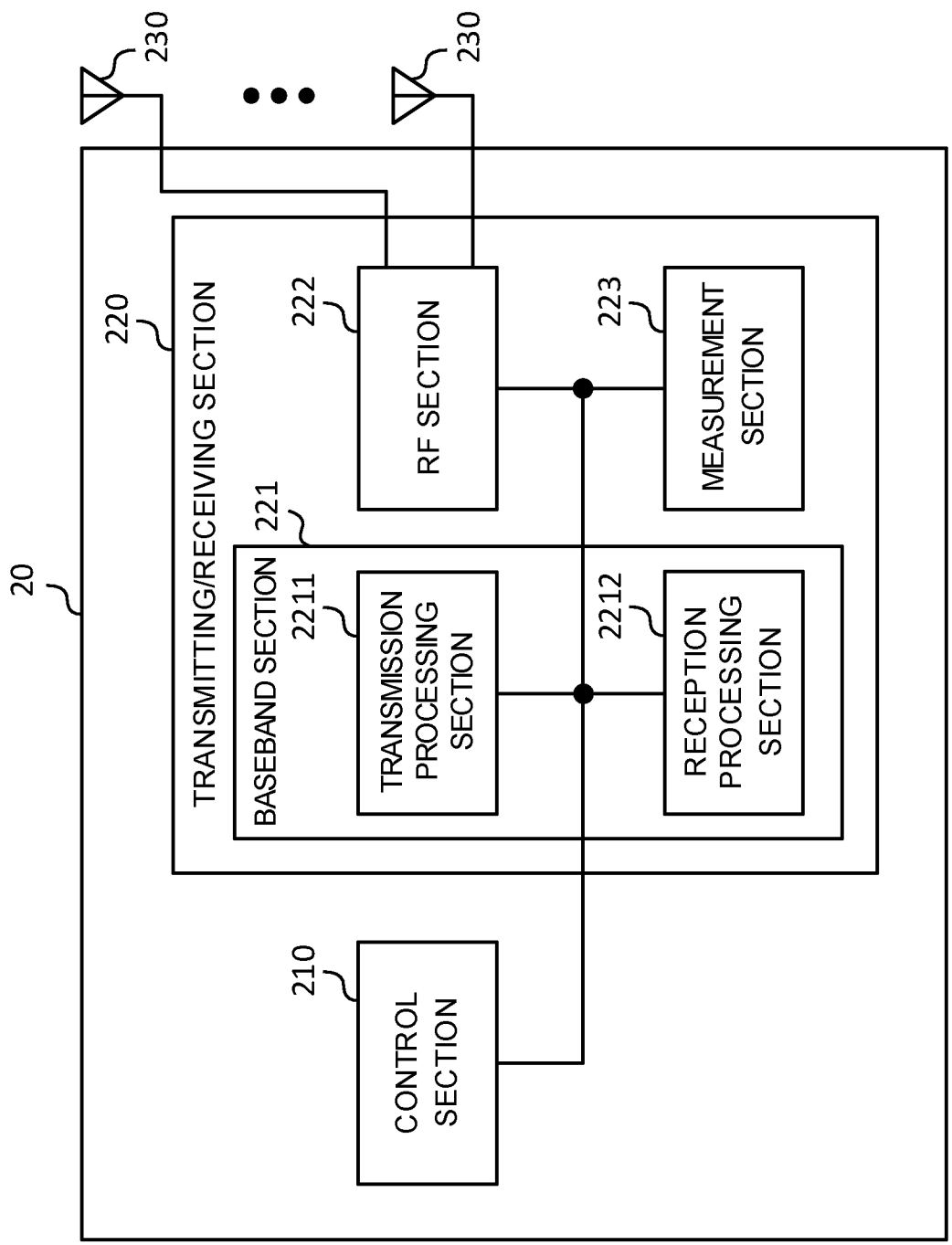
FIG. 4 is a diagram to show an example of a structure of a user terminal according to one embodiment.

FIG. 4 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may performs the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may performs transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the transmission line interface 240.

Note that each of the transmitting/receiving sections 220 may receive a reference signal (RS) for beam failure detection (BFD).

When no set of RS indices corresponding to resources for the BFD is configured by higher layer signaling (for example, failure detection resource configuration information (higher layer parameters "failureDetectionResourcesToAddModList," "failureDetectionResources," and the like)), the control section 210 may determine RS indices up to a certain number to be included in the set, based on TCI states configured for the CORESETs.

For each CORESET for which no TCI state is configured (for example, CORESET #0), the control section 210 may determine that an RS index having the same value as an RS index corresponding to the QCL assumption for the CORESET, is to be included in the set.

The control section 210 may determine a QCL assumption for the CORESET for which no TCI state is configured, based on a latest resource of a certain channel (for example, a PRACH).

In a case that the set of RS indices corresponding to the resources for the BFD is configured by higher layer signaling, the control section 210 may perform control for performing BFD by using each RS corresponding to the set and each RS corresponding to the RS index of the same value as an RS index corresponding to the QCL assumption for the CORESET for which no TCI state is configured.

In a case that the QCL assumption for the CORESET for which no TCI state is configured is changed from the first assumption (for example, a certain beam) to the second assumption (for example, another beam), the control section 210 may determine a TCI state of another or each of a plurality of other configured CORESETs, based on the second assumption.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 5:
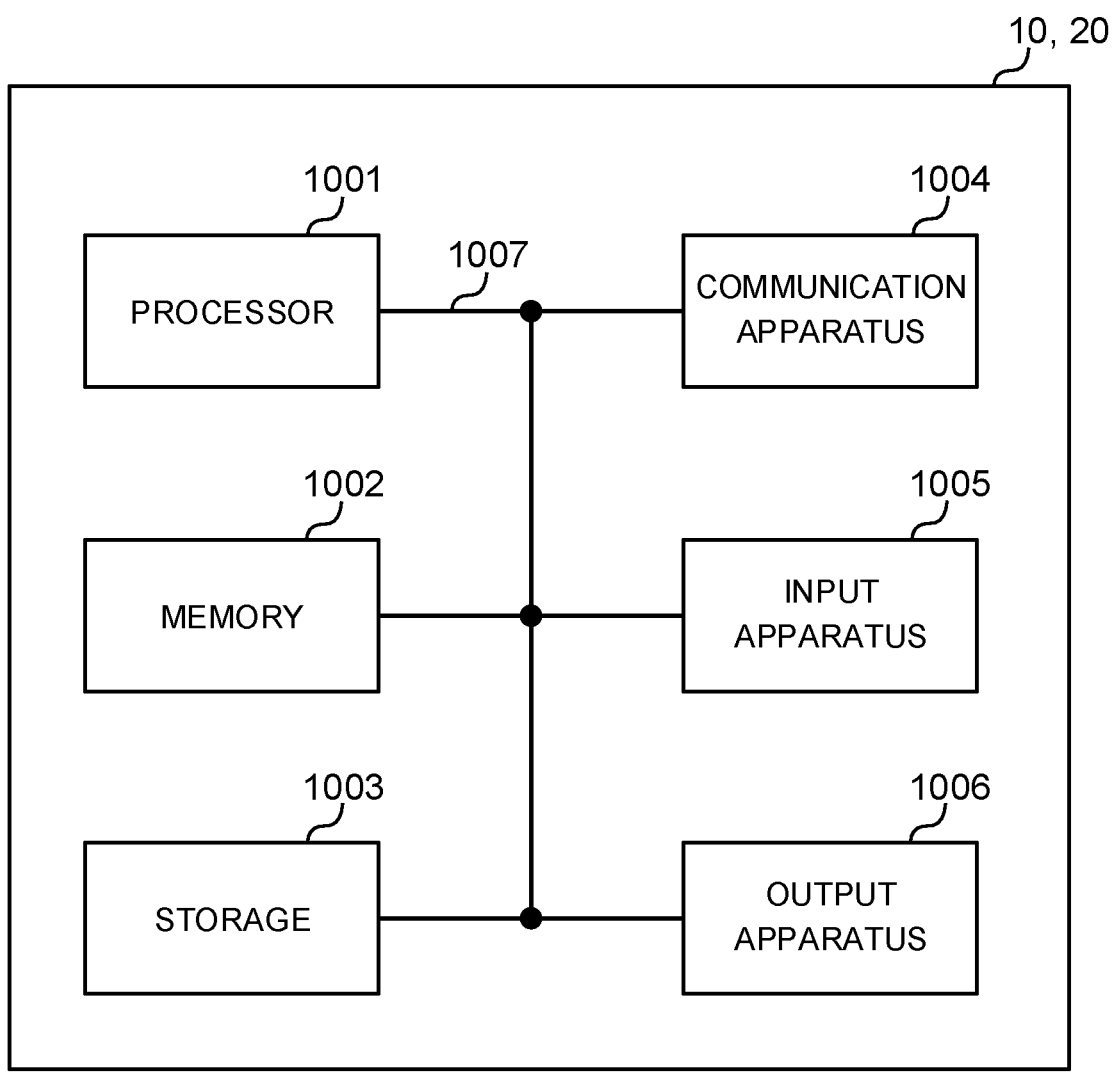
FIG. 5 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 5 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a specific filter processing performed by a transceiver in the frequency domain, a specific windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a "TTI," one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a "TTI having a time length exceeding 1 ms," and a short TTI (for example, a shortened TTI and so on) may be interpreted as a "TTI having a TTI length shorter than the TTI length of a long TTI and equal to or longer than 1 ms."

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Notification of information is by no means limited to the aspects/embodiments described in the present disclosure, and other methods may be used as well. For example, notification of information in the present disclosure may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be notified using, for example, MAC control elements (MAC CEs).

Also, notification of certain information (for example, notification of "X holds") does not necessarily have to be notified explicitly, and can be notified implicitly (by, for example, not notifying this certain information or notifying another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding wait)," "quasi-co-location (QCL)," a "TCI state (Transmission Configuration Indication state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an IoT (Internet of Things) device such as a sensor, and the like.

Furthermore, the base station in the present disclosure may be interpreted as a "user terminal." For example, each aspect/embodiment of the present disclosure may be applied to the structure that replaces a communication between a base station and a user terminal with a communication between a plurality of user terminals (for example, which may be referred to as "D2D (Device-to-Device)," "V2X (Vehicle-to-Everything)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a "side channel."

Likewise, the user terminal in the present disclosure may be interpreted as a "base station." In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a processor that determines, in a case that a resource for beam failure detection (BFD) is not configured by higher layer signaling, indices of a reference signal (RS) up to a certain number based on a Transmission Configuration Indication (TCI) state for a Control REsource SET (CORESET); and
a receiver that receives the RS,
wherein the processor determines, when a Quasi-Co-Location (QCL) assumption for a CORESET associated with a search space for system information is changed to another QCL assumption, a QCL assumption for another CORESET based on the other QCL assumption, and
wherein the processor determines the QCL assumption for the CORESET associated with the search space for the system information, when no TCI state is configured for the COREST, based on a Synchronization Signal Block (SSB) corresponding to a latest random access channel.

2. A radio communication method for a terminal, the radio communication method comprising:
determining, in a case that a resource for beam failure detection (BFD) is not configured by higher layer signaling, indices of a reference signal (RS) up to a certain number based on a Transmission Configuration Indication (TCI) state for a COntrol REsource SET (CORESET); and
receiving the RS;
determining, when a Quasi-Co-Location (QCL) assumption for a CORESET associated with a search space for system information is changed to another QCL assumption, a QCL assumption for another CORESET based on the other QCL assumption; and
determining the QCL assumption for the CORESET associated with the search space for the system information, when no TCI state is configured for the COREST, based on a Synchronization Signal Block (SSB) corresponding to a latest random access channel.

3. A system comprising:
a terminal that comprises:
a processor that determines, in a case that a resource for beam failure detection (BFD) is not configured by higher layer signaling, indices of a reference signal (RS) up to a certain number based on a Transmission Configuration Indication (TCI) state for a COntrol REsource SET (CORESET); and
a receiver that receives the RS,
wherein the processor determines, when a Quasi-Co-Location (QCL) assumption for a CORESET associated with a search space for system information is changed to another QCL assumption, a QCL assumption for another CORESET based on the other QCL assumption, and
wherein the processor determines the QCL assumption for the CORESET associated with the search space for the system information, when no TCI state is configured for the COREST, based on a Synchronization Signal Block (SSB) corresponding to a latest random access channel; and
a base station that comprises:
a transmitter that transmits the RS.

* * * * *